Aug. 31, 1965     E. MÜLLER     3,203,216
MACHINE FOR INCASING CABLES AND THE LIKE
Filed Sept. 20, 1960     9 Sheets-Sheet 5
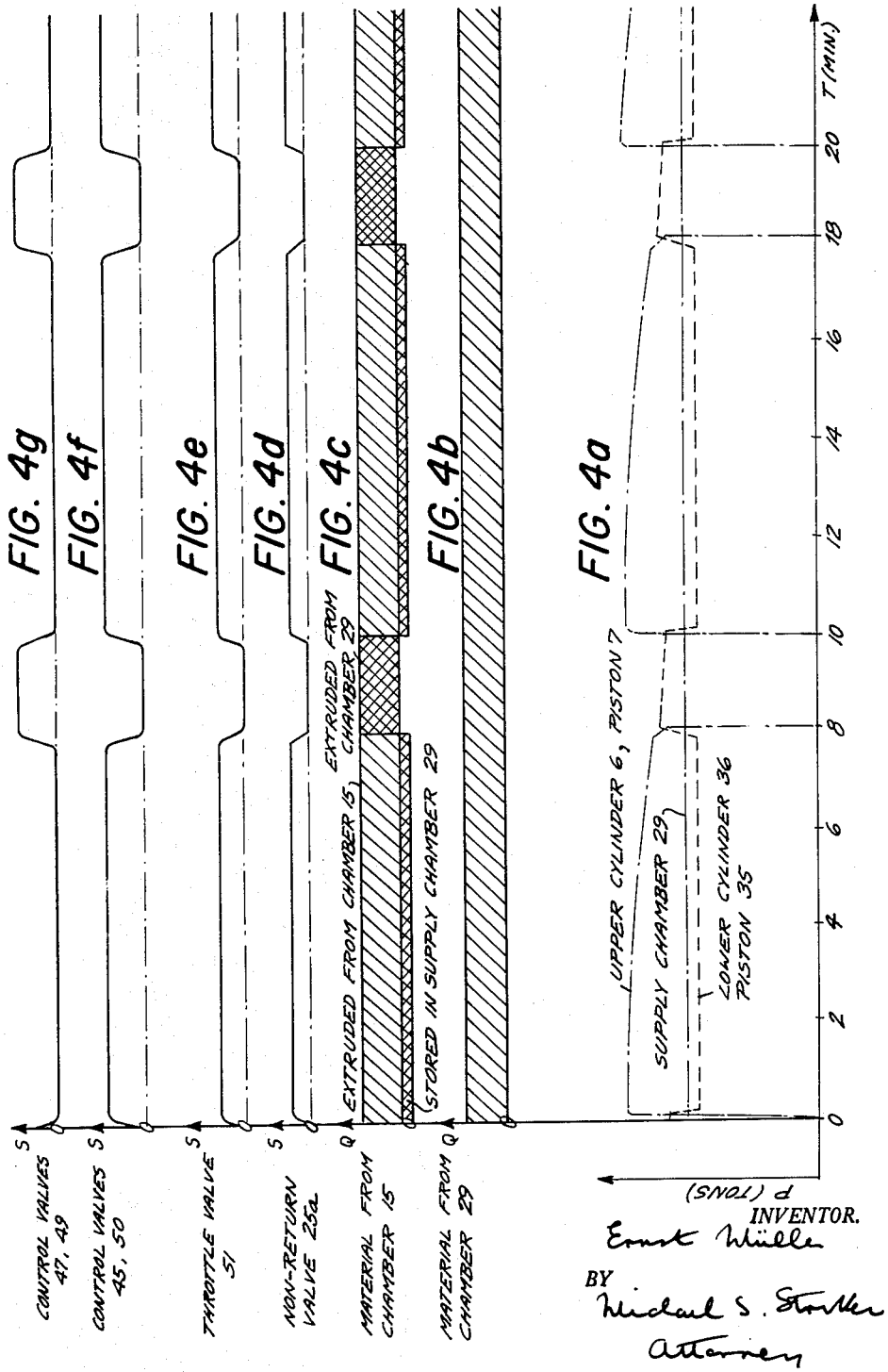

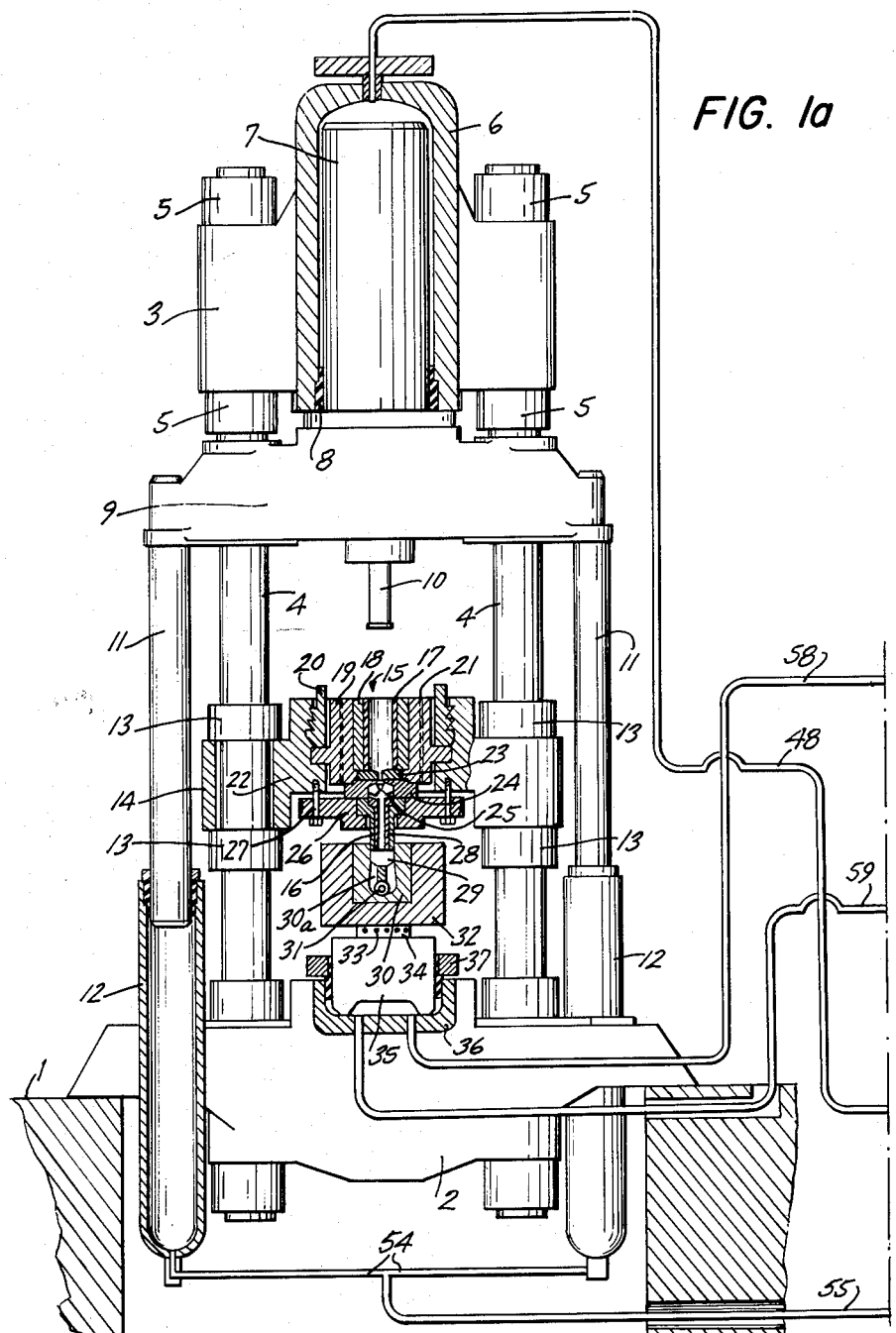

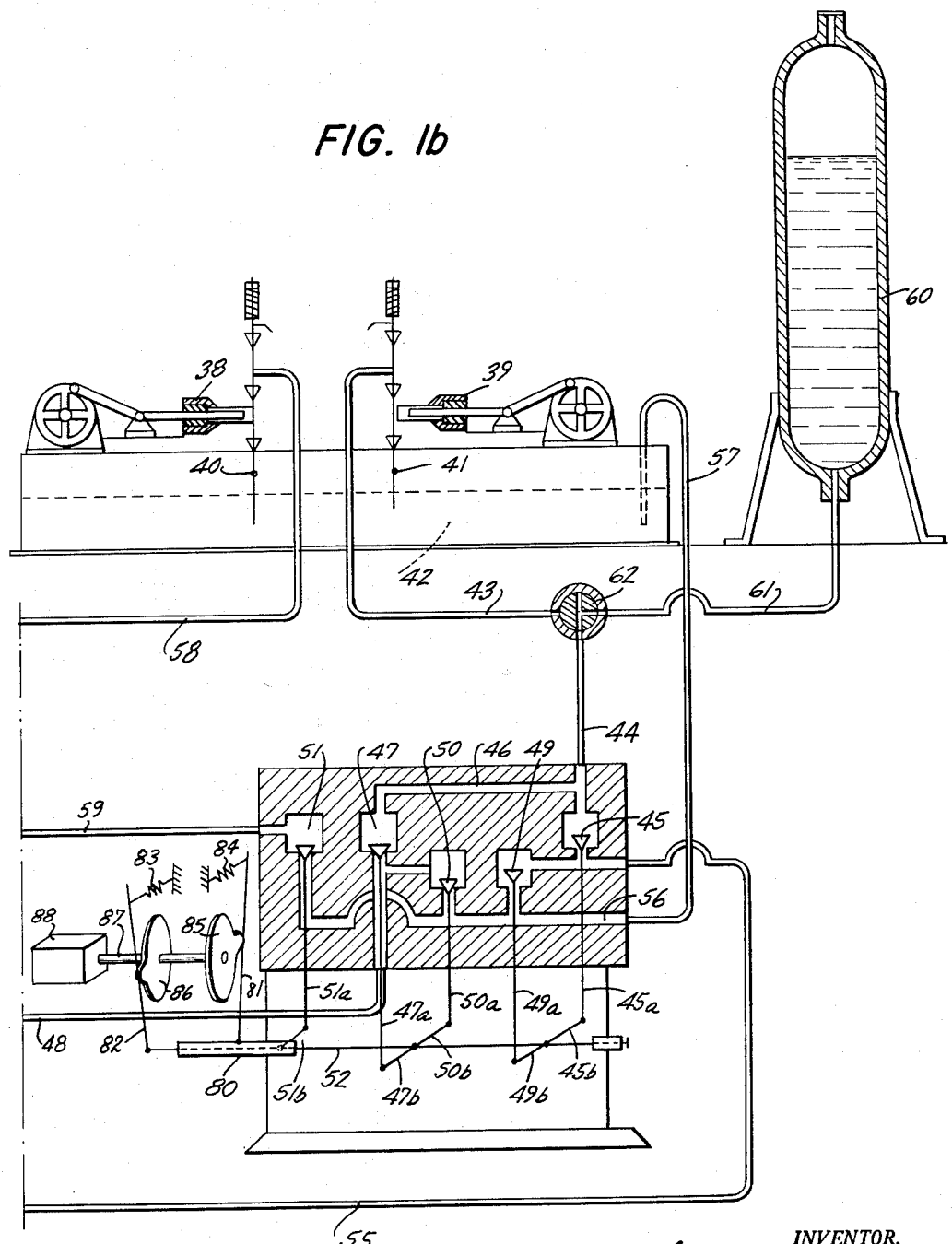

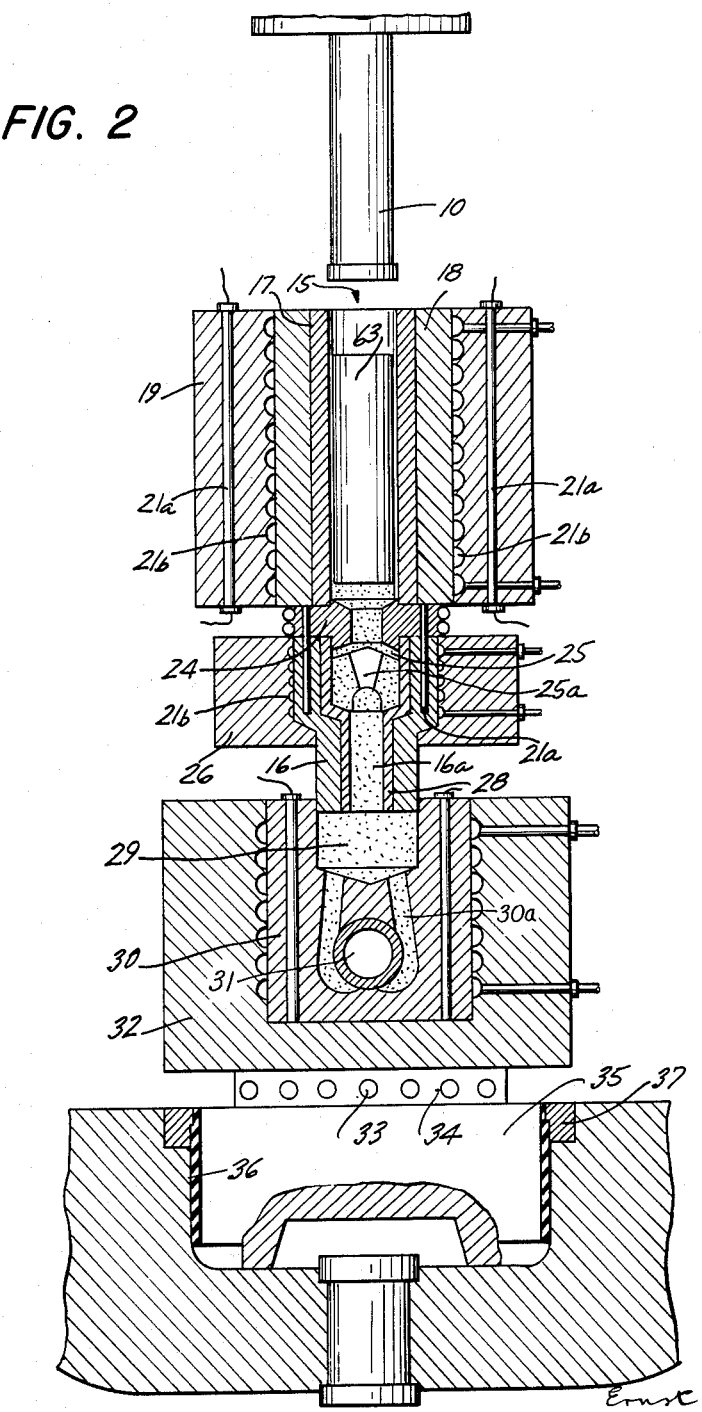

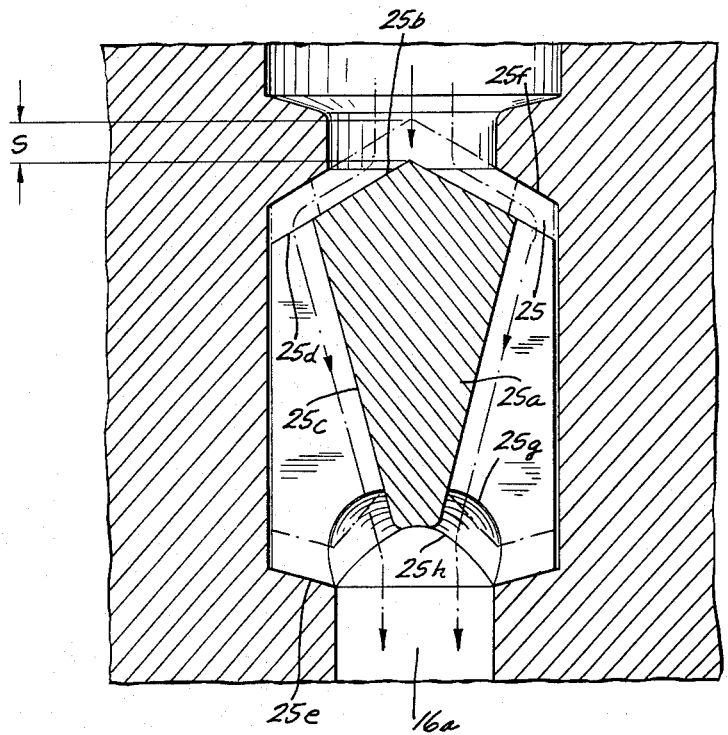

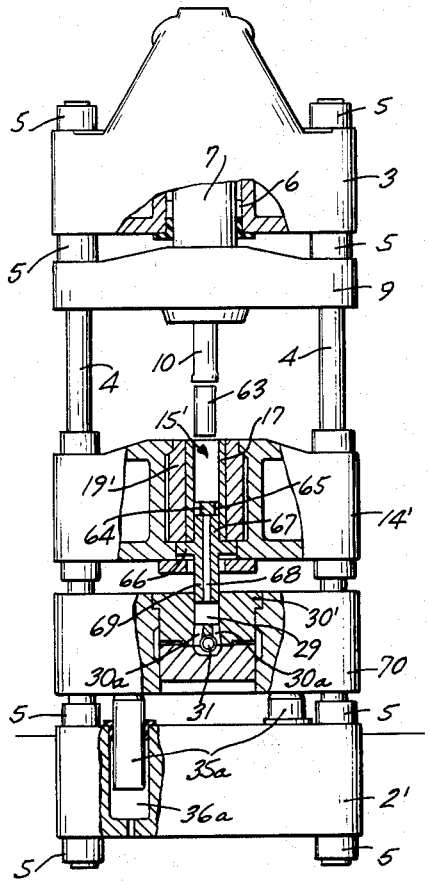
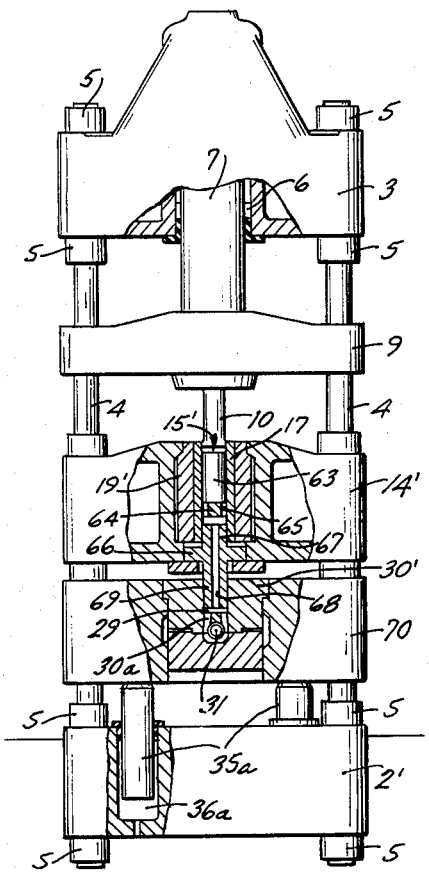

Aug. 31, 1965  E. MÜLLER  3,203,216
MACHINE FOR INCASING CABLES AND THE LIKE
Filed Sept. 20, 1960  9 Sheets-Sheet 7

INVENTOR.
Ernst Müller
BY Michael S. Striker
Attorney

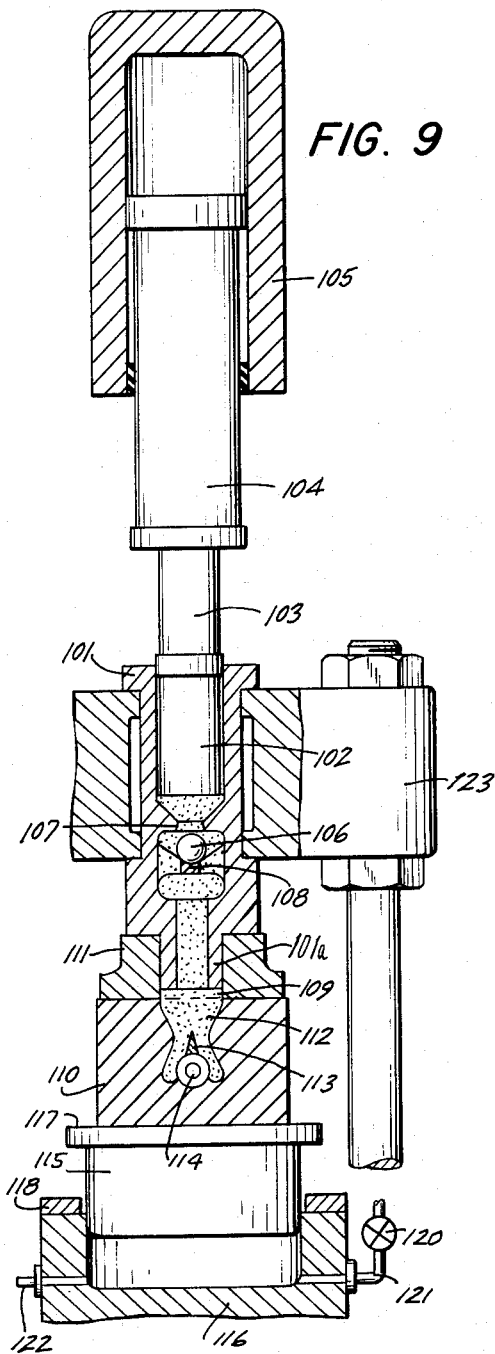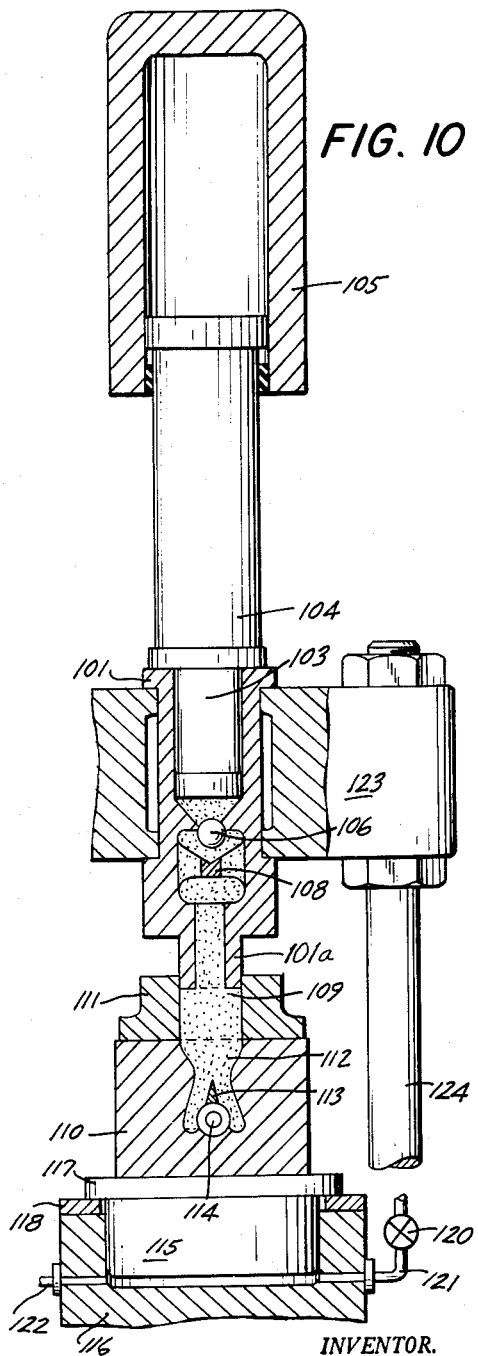

Aug. 31, 1965   E. MÜLLER   3,203,216
MACHINE FOR INCASING CABLES AND THE LIKE
Filed Sept. 20, 1960   9 Sheets-Sheet 9
FIG. 11
FIG. 12
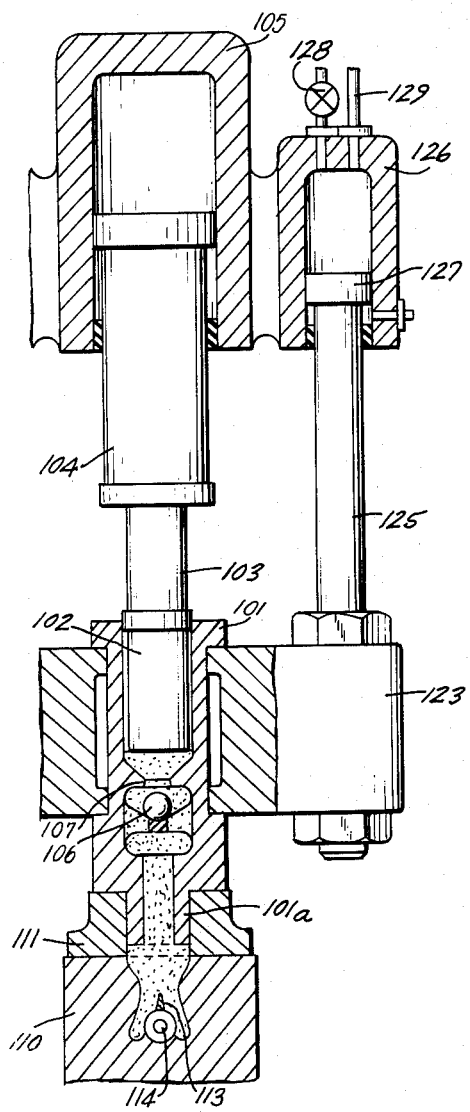
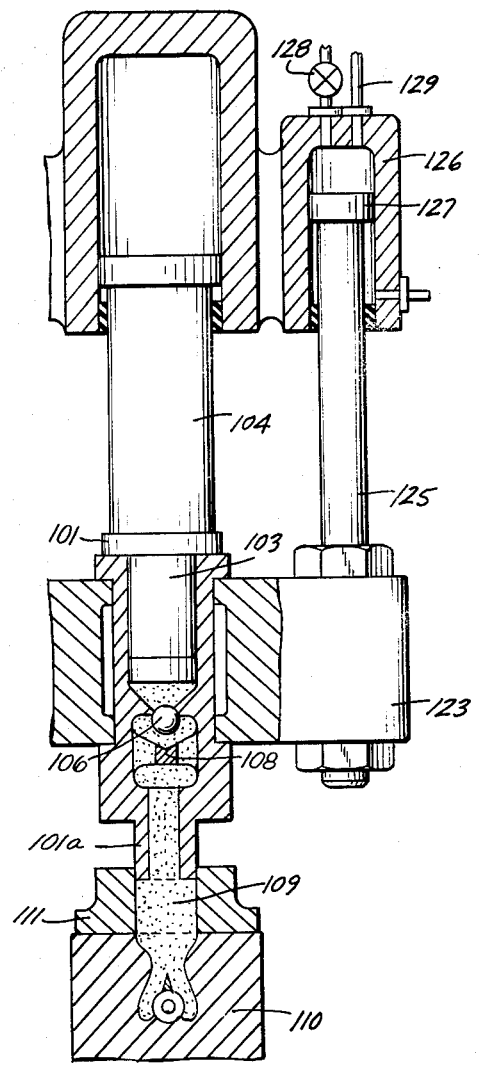
INVENTOR.
Ernst Müller
BY Michael S. Striker
Attorney United States Patent Office 3,203,216
Patented Aug. 31, 1965

1

3,203,216
MACHINE FOR INCASING CABLES
AND THE LIKE
Ernst Müller, Zieglerstr. 57, Duisburg, Germany
Filed Sept. 20, 1960, Ser. No. 57,214
11 Claims. (Cl. 72—258)

This application is a continuation-in-part of copending application Serial No. 691,409, filed October 21, 1957, and entitled "Cable Covering Press," now abandoned.

The present invention relates to extruding presses which are capable of incasing elongated members such as cables and the like in a suitable covering.

Presses of this type have very serious problems resulting from the extremely high pressures at which such presses operate. At the present time not only because of these high pressures but also because the extruded material moves along a path which changes its direction undesirably it is not possible to provide a covering, for a cable or the like, which is made of metal except perhaps when the metal is a material such as lead. In conventional presses the operation is not continuous and therefore the cable or the like which is to be covered has an intermittent movement. The result of this action is that the covering has the so-called bamboo rings which are extremely undesirable and which detract from the uniformity of the covering. Moreover, due to the high temperature of the press particularly at the portion thereof through which the cable or the like passes the cable or other elongated member which is being covered is subjected to an extremely high temperature especially during the interruption in the movement of the cable, and the result is that the paper insulation of the cable to which the covering is applied becomes burned or damaged and this of course results in unsatisfactory cables which must be rejected.

While it has been proposed to provide a continuous extrusion of a material onto a continuously moving cable, up to the present it has only been possible to obtain this result with extremely complex structures requiring at least a pair of independent extruding structures which are alternately set into operation. Not only is this construction undesirable because of its bulk and complexity, but in addition the direction of movement of the extruded material changes sharply giving rise to tremendous friction losses and greatly reducing the efficiency.

One of the objects of the present invention is to provide a press of the above type which makes it possible to cover a continuously moving cable or the like with a covering of a metal such as aluminum.

Another object of the present invention is to provide a continuous incasing of a continuously moving elongated member without requiring the use of a pair of independent extruding structures which are alternately set into operation.

A further object of the present invention is to provide in a press of the above type a material flow which has no sharp changes in direction and which is confined substantially to movement along a straight line so that the efficiency is not detracted by sharp changes in the direction of movement of the extrusion material.

An additional object of the present invention is to provide a structure of the above type with a non-return valve which will reliably control the flow of a metallic material such as aluminum even though this material is subjected to extremely high pressures.

It is furthermore an object of the present invention to provide a structure of the above type which will reliably maintain the temperature of an extruded metal such as aluminum at such values that the metal is in the best possible condition for the extruding operations.

2

It is a still further object of the present invention to provide a press of the above type which is almost fully automatic in its operation.

It is still another object of the present invention to provide, with a single extruding structure which directs the extruded material such as a suitable metal substantially along a straight line, a continuous covering of an elongated continuously moving member without any "bamboo rings" and with extreme uniformity in the covering.

It is also an object of the present invention to provide a process for incasing a continuously moving elongated member in such a way that the rate of flow of the covering material, such as metal, remains substantially constant during the entire incasing operation.

With the above objects in view the invention includes, in a press for uniformly incasing in a covering of metal or the like an elongated member which continuously advances longitudinally through the press, a receiving chamber means which extends along a predetermined axis, which has an inlet end and an opposed outlet end, and which defines a receiving chamber for receiving a charge of covering material. A main ram is coaxial with this receiving chamber means, and a first moving means is operatively connected with this main ram for axially moving the latter cyclically along a working stroke into the receiving chamber means through the inlet end thereof, for pressing the charge out of the latter through the outlet end thereof, and then along a return stroke out of the receiving chamber means so that the latter may be provided with a fresh charge before the next working stroke. A press chamber means defines a press chamber through which the elongated member which is to be covered continuously passes and in which the covering material is pressed around the elongated member, and this press chamber means is coaxial with and spaced axially from the receiving chamber means at the side of the latter opposite from the main ram. Thus, the press chamber means and the receiving chamber means form a pair of chamber means of the structure of the invention. An outer hollow cylinder and an inner hollow cylinder which extends telescopically into the outer hollow cylinder are respectively operatively connected coaxially with this pair of chamber means, and these cylinders define between the pair of chamber means a supply chamber to which the covering material flows from the receiving chamber means. The inner cylinder terminates within the outer cylinder in an end face which forms an auxilary ram. A non-return valve means is located between the supply chamber and the receiving chamber means next to the outlet end of the latter for preventing material from flowing from the supply chamber through the outlet end of the receiving chamber means into the latter. A second moving means is operatively connected with one of the above cylinders for moving this one cylinder, while the first moving means moves the main ram along its return stroke, in a direction which reduces the volume of the supply chamber so that the auxiliary ram continues the flow of material into the press chamber means while a fresh charge is placed in the receiving chamber means. This second moving means provides, during the working stroke of the main ram, a yielding movement of this one cylinder, in response to the pressure of the material in the supply chamber, in an opposite direction which increases the volume of the supply chamber, so that part of the covering material is stored in the supply chamber during the working stroke of the main ram so as to be available for displacement by the auxiliary ram out of the supply chamber during the return stroke of the main ram. In this way the elongated member is continuously and uniformly covered while the covering material moves substantially along the common axis of the several elements referred to above to the press chamber means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1, composed of FIGS. 1a and 1b, is a partly sectional elevation of a press according to the present invention, FIG. 1 in addition diagrammatically illustrating the hydraulic structure for controlling the movable parts of the press;

FIG. 2 is an enlarged sectional elevation of a press according to the present invention;

FIG. 3 is a fragmentary sectional elevation, on an enlarged scale, of a non-return valve according to the present invention;

FIGS. 4a–4g are respectively diagrams illustrating the operation of various of the elements of FIG. 1;

Figure 7:
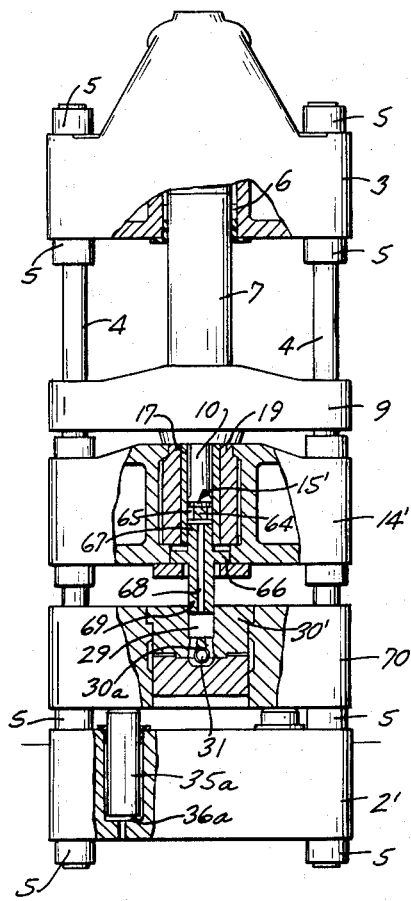

FIGS. 5–8 respectively illustrate, in a partly sectional elevation, another embodiment of a press according to the invention in various stages of operation;

FIGS. 9 and 10 show, in sectional elevation, a further embodiment of a press according to the invention in different stages of operation, respectively; and FIGS. 11 and 12 respectively illustrate in sectional elevation and in different stages of operation still another embodiment of a press according to the invention.

Referring now to FIG. 1, there is illustrated therein a press according to the invention which is carried by the base structure 1. The lower beam 2 of the press is carried by the base structure 1, and at the upper part of the press is located the cylinder beam 3 which is fixed to and carried by the lower beam 2 by means of the columns 4. These columns 4 threadedly carry the nuts 5 located above and below the beam 3 as well as above and below the beam 2, so that in this way the frame of the press is formed and the beam 3 is supported at the desired elevation above the beam 2.

The cylinder beam 3 fixedly carries a cylinder 6 of a hydraulic moving means, and this moving means includes the piston 7 slidable within the cylinder 6, the latter being provided with a sealing ring 8 surrounding the piston 7 so as to maintain fluid-tightness in the cylinder 6. The piston 7 is fixed at its lower end to a crosshead 9, and this crosshead 9 fixedly carries the main ram 10 of the press. The movable crosshead 9 together with the main ram 10 are illustrated in their uppermost position in FIG. 1. The crosshead 9 together with the main ram 10 are raised to their uppermost position by the pistons 11 which form that part of the moving means which returns the main ram 10 to its upper position, these pistons 11 moving the main ram 10 upwardly along its return stroke. The pistons 11 are respectively slidable in the cylinders 12. Thus, the moving means for moving the main ram 10 along its working and return strokes includes the piston and cylinder means 6, 7 as well as the piston and cylinder means 11, 12, the latter piston and cylinder means moving the main ram 10 along its return stroke while the piston and cylinder means 6, 7 moves the main ram 10 along its working stroke.

The columns 4 threadedly carry additional nuts 13 respectively located above and below a second crosshead 14 which thus has its elevation fixed, this second crosshead 14 being supported in this way by the columns 4. The crosshead 14 serves to carry the receiving chamber means 15 for receiving the charge in the form of a heated block of metal which is extruded through the press to form the covering for the continuously advancing cable or the like. The crosshead 14 also serves to carry a cylinder 16 whose lower annular surface forms an auxiliary ram as described below. The receiving chamber 15 includes the inner sleeve 17, an intermediate sleeve 18 surrounding the inner sleeve 17, and the exterior jacket 19 which surrounds the intermediate sleeve 18. This jacket 19 has intermediate its ends an outwardly directed annular flange resting on an upwardly directed shoulder of the crosshead 14 at a central portion 22 of the latter, and just above the outer annular flange of the jacket 19 the central portion 22 of the crosshead 14 is threaded so as to receive the threaded ring 20 which bears downwardly against the flange of the element 19 so as to fix the latter to the crosshead 14 in this manner. The outer jacket 19 is provided with the diagrammatically illustrated means 21 in the form of electrical heating elements, cooling conduits, and the like for the purpose of controlling the temperature of the receiving chamber 15. The receiving chamber 15 has an upper open inlet end through which the main ram 10 is capable of moving into the receiving chamber 15, and at the lower end of the receiving chamber 15 there is located a plate 23 formed with a central bore passing therethrough and forming the outlet end of the receiving chamber 15. Thus, the block of metal which is extruded is pressed by the main ram 10 out of the receiving chamber 15 through the central bore of the plate 23 which forms the outlet of the receiving chamber 15. A plate 24 is located directly next to the plate 23 and formed with an axial cutout aligned with the bore of the plate 23 and the axis of the chamber 15, and the cutout of the element 24 forms the housing 25 for a non-return valve means of the invention. This non-return valve means is described below in connection with FIGS. 2 and 3. The plate 24 is clamped between the plate 23 and a third plate 26 which is fixed to the central portion 22 of the crosshead 14 by the screws 27. This plate 26 is formed with a stepped bore coaxial with the chamber 15, and this stepped bore of the plate 26 serves to support the cylinder 16 coaxially with the chamber 15, this cylinder 16 having at its upper end an outwardly directed annular flange engaging the upwardly directed shoulder of the bore of the plate 26 and also engaging the lower surface of the plate 24, in the manner shown in FIG. 1. The cylinder 16 carries a sleeve 28 in its interior, and it will be noted that the bore of the cylinder 16 is also stepped at its upper portion to provide the cylinder 16 with an upwardly directed shoulder on which an outwardly directed annular flange at the upper end of the sleeve 28 rests.

The elongated hollow cylinder 16 extends telescopically into a coaxial outer cylinder 30, and these cylinders define between themselves at the upper portion of the cylinder 30 the supply chamber 29 which receives the extruded material from the receiving chamber 15. The extruded material flows from the receiving chamber 15 through the non-return valve means and the hollow cylinder 16 into the supply chamber 29. The cylinder 30 has beneath the bore of the cylinder 16 a solid portion formed with passages 30a which extend substantially parallel to the axis of cylinder 30 and which terminate in a lower press chamber 31 formed in the element 30, this press chamber 31 communicating by way of the passages 30a with the supply chamber 29. Thus the lower portion of the element 30 forms a press chamber means which is situated beneath and in alignment with the supply chamber 29 and the receiving chamber 15. The cable or the like which is to be covered passes through the press chamber means 31 in a direction normal to the plane of FIG. 1 and extruded material flows through the passages 30a to the exterior of the elongated cable so as to incase the latter. An outer jacket 32 is shrunk onto the element 30, and this outer jacket 32 is fixed with a base plate 34 formed with the passages 33 adapted to receive cooling or heating fluid or other cooling or heating elements so as to regulate the temperature of the elements 30 and 32 and thus control the temperature of the metal or other material in the supply chamber 29 and press chamber means 31. The plate 34 is fixed to the upper end of a piston 35 of another hydraulic moving means, this piston 35 being coaxial with the receiving chamber 15 and slidable in a cylinder 36 which is carried by the lower beam 2. The annular member 37 is fixed to the cylinder 36 and carries a sealing ring to provide fluid-tightness within the cylinder 36.

The pair of hydraulic moving means which include the pistons 7 and 35 also includes a pair of pumps for providing the fluid under pressure, and as illustrated in FIG. 1 these pumps 38 and 39 are independent of each other. There may be a group of pumps 38 and a group of pumps 39, or, if desired, a single pump which is controlled to alternately supply fluid under pressure to the cylinder 6 and the cylinder 36 may be used, although the arrangement of FIG. 1 where the pump 38 cooperates with the cylinder 36 and the pump 39 cooperates with the cylinder 6 is preferred.

The pumps 38 and 39 suck the hydraulic liquid from the reservoir 42 through the suction conduits 40 and 41, respectively. The pump 39 delivers the fluid under pressure for the piston 7 through the conduit 43. This conduit 43 communicates with a three-way valve 62 which when the piston 7 is to be moved downwardly with the main ram 10 to move the latter along its working stroke is set so that the fluid under pressure will move from the conduit 43 through the valve 62 to the conduit 44 to supply the latter with fluid under pressure. At this time the valve 45 shown diagrammatically in FIG. 1 is closed so that the fluid under pressure flows along the conduit 46 from the conduit 44 to the valve 47 which is open at this time, and fluid flows through the open valve 47 into the conduit 48 which communicates with the upper end of the cylinder 6 so that the fluid under pressure acts on the piston 7 to move the latter together with the crosshead 9 and the main ram 10 downwardly, and thus the main ram 10 is moved along its working stroke. Of course, a block of heated metal such as aluminum has already been placed within the receiving chamber 15 to be extruded by the main ram 10.

The valves 45 and 47 as well as the remaining valves 49, 50 and 51 are respectively carried by the rods 45a, 47a, 49a, 50a, and 51a, these several rods being fluid-tightly guided through suitable stuffing boxes or other sealing glands. At their lower ends these rods are pivotally connected with levers which actuate the rods. Thus, the rods 45a, 47a, 49a, 50a, and 51a are respectively pivotally connected to the levers 45b, 47b, 49b, 50b, and 51b, as illustrated in FIG. 1. The levers 45b and 49b form different portions of a single bar which is fixed intermediate its ends to a shaft 52, and the levers 50b and 47b form different portions of a single bar which is fixed intermediate its ends also to the shaft 52. Thus, when this shaft 52 is turned in one direction the valves 45 and 50 will be closed while the valves 47 and 49 will be opened, and when the shaft 52 is turned in the opposite direction the valves 45 and 50 will be opened while the valves 47 and 49 will be closed. The shaft 52 is supported for turning movement in suitable bearings and is fixedly connected at its left end, as viewed in FIG. 1, with a lever 82 which is urged by the spring 83 against the periphery of a cam 86 which has a camming portion for rocking the lever 82 and the shaft 52 in a direction which opens the valves 45 and 50 and closes the valves 47 and 49. When this camming portion of the cam 86 is not in engagement with the lever 82, the spring 83 maintains this lever against the remainder of the periphery of the cam 86 so as to close the valves 45 and 50 and open the valves 47 and 49. The cam 86 rotates at a uniform speed and as is apparent from FIG. 1 the configuration of the cam 86 is such that during each of its revolutions the valves 45 and 50 will be opened for a time substantially shorter than the period during which the valves 47 and 49 are opened. The shaft 52 extends freely through a sleeve 80 which is freely turnable on the shaft 52, and this sleeve 80 is fixed to the lever 51b which extends radially from the hollow tubular shaft 80, so that the valve 51 can be actuated independently of the remaining valves. The sleeve 80 is fixed to a lever 81 urged by the spring 84 against a cam 85 which may be substantially identical with the cam 86 but which is approximately 180 degrees out of phase with the cam 86. Thus, the cam 85 has a camming portion which will maintain the valve 51 closed for a relatively small fraction of the time required for each revolution of the cam 85, and during the remainder of each revolution of the cam 85 the valve 51 is open. As is apparent from the description below the valve 51 is opened only to a slight degree so as to provide a throttled flow of the hydraulic fluid through the valve 51 when it is in its open position. The cams 85 and 86 are fixedly carried by a common cam shaft 87 driven by a suitable timing motor 88 which turns the cams at a constant speed of rotation which in the example described below in connection with FIGS. 4a–4g is a rotational speed of six revolutions per hour. Thus, in the example illustrated a single revolution of the shaft 87 and the cams 85 and 86 requires 10 minutes. For example, the timing motor 88 may be in the form of a synchronous motor provided with a suitable gear reduction unit which will turn the shaft 87 uniformly at a speed of six revolutions per hour. Of course, instead of the illustrated arrangement of levers, it is possible to provide a shaft with suitable cams which act directly on the rods or valve stems fixed to the several valves so as to actuate the latter in the desired sequence, and it is also possible to provide a suitable servo arrangement for controlling the sequence of operation of the several valves.

During the time that the pump 39 operates to supply the cylinder 6 with the hydraulic fluid under pressure so as to move the main ram 10 along its working stroke, the cylinders 12 are placed in communication with the reservoir 42 so that the fluid in the cylinders 12 is free to flow back to the reservoir 42, and thus there is no resistance to the movement of the several pistons 11 into the several cylinders 12, respectively. Thus, the cylinders 12 communicate with the conduit 54 which in turn communicates with the conduit 55. This latter conduit 55 communicates with the valve 49 which is open when the valve 45 is closed, so that the fluid moving out of the cylinders 12 flows through the valve 49 into the conduit 56 and from the latter along the conduit 57 back into the reservoir 42.

During the first operating cycle of the press when the operations are started the piston 35 is located against the bottom end of the cylinder 36 so that even though the valve 51 is open at this time it will have no influence on the operations of this first cycle, as will be apparent from the description below.

When the main ram 10 has reached its lowermost position at the end of its working stroke and has extruded the block of metal from the receiving chamber means 15, this main ram 10 is returned along its return stroke to its upper starting position, and during the return stroke of the main ram 10 the piston 35 is raised so as to move the upper portion of the cylinder 30 upwardly along the cylinder 16 and thus reduce the volume of the supply chamber 29 to continue the extrusion of the material out of the supply chamber 29 into the press chamber 31 so that the incasing of the cable or the like which continues to move is not interrupted. In the illustrated example the pump 38 is set into operation at the end of the working stroke of the ram 10, and at this time the camming portion of the cam 85 engages the lever 81 so as to close the valve 51. Because the valve 51 is closed at this time, fluid cannot flow out of the cylinder 36 through the conduit 59. The fluid under pressure is delivered by the pump 38 into the conduit 58 so as to flow into the cylinder 36 to move the piston 35 together with the press chamber means 31 and the element 30 upwardly, and thus at this time the lower end face of the cylinder 16 acts as the auxiliary ram to continue the extrusion of the metal or the like from the supply chamber 29 through the passages 30a into the press chamber means 31.

Thus, simultaneously with the closing of the valve 51 the three-way valve 62 is actuated by any suitable cam and lever arrangement or manually so as to cut off communication between the conduits 43 and 44 and so as to place the conduit 44 in communication with the conduit 61. This conduit 61 communicates with a pressure accumulator 60 in which fluid under pressure is stored in a well-known manner, and at this time the fluid under pressure flows from the pressure accumulator 60 through the conduit 61 to the conduit 44. During this phase of the operation the valve 45 is open while the valves 47 and 49 are closed. It will be noted that the camming portion of the cam 86 engages the lever 82 simultaneously with engagement of the camming portion of the cam 85 with the lever 81, so that during the time that the valve 51 is closed the lever 82 is placed in a position opening the valves 45 and 50 and closing the valves 47 and 49. Thus, the fluid under pressure which reaches the conduit 44 at this time from the conduit 61 flows through the conduit 55 into the conduits 54 and from the latter into the cylinders 12 so as to raise the pistons 11 and thus raise the crosshead 9 in order to return the main ram 10 along its return stroke, and at this time the conduit 48 communicates with the open valve 50, the valve 47 being closed at this time, so that through the valve 50 the conduit 48 communicates with the conduit 56 and thus the fluid in the cylinder 6 can return through this conduit 56 and the conduit 57 to the reservoir 42, and thus the fluid under pressure which acts on the pistons 11 can easily raise the crosshead 9 to return the main ram 10 to its upper starting position.

As soon as the main ram 10 has reached the end of its return stroke, while the piston 35 is still moving upwardly, the three-way valve 62 is actuated either automatically by a suitable cam or lever arrangement or manually to be placed in a position cutting off communication between conduits 44 and 61 and placing conduit 43 in communication with the conduit 61, so that at this time the fluid under pressure delivered to the conduit 43 by the pump 39 will be delivered along the conduit 61 into the accumulator 60 to be available for the next raising of the pistons 11. Also, at this time, which is to say immediately after the main ram 10 has reduced the end of its return stroke, a fresh charge in the form of a block of heated metal is dropped into the receiving chamber 15 so as to be available for the next operating cycle.

It will be noted that at the beginning of the second and all subsequent operating cycles the piston 35 is at its uppermost position and the cylinder 36 is filled with the hydraulic fluid under pressure received from the pump 38. It is only during the initial cycle that the piston 35 is in the position shown in FIG. 1. Thus, at the beginning of the second and all subsequent cycles of operation the supply chamber 29 has its smallest volume.

During the working stroke of the piston 10 which takes place during the second and all subsequent cycles of operation the block within the receiving chamber means 15 is extruded out of the latter in the manner described above. The lever 82 engages the exterior portion of the cam 86 which is of smaller diameter so that the valves 45 and 50 are closed while the valves 47 and 49 are open, and at the beginning of each cycle the valve 62 is actuated as described above so that the fluid under pressure will flow from the conduit 43 into the conduit 44. Thus this fluid under pressure will flow through the open valve 47 to the conduit 48 so as to move the crosshead 9 downwardly, and as was described above at this time the cylinders 12 are placed in communication with the reservoir 42 through the open valve 49 so that these pistons 11 move into the cylinders 12.

Also during this time, which is to say during the working stroke of the second and all subsequent cycles of operation, the lever 81 engages the peripheral portion of the cam 85 which is of smaller diameter, and thus the valve 51 is in its open position. This valve 51 at this time is opened only to a slight degree so that a throttled flow of fluid therethrough takes place. Of course, when the working stroke of the main ram 10 is started the pump 38 stops its operation. The slight opening of the valve 51 is such that as the main ram 10 advances downwardly the pressure of the material extruded into the supply chamber 29 is great enough to force the press chamber means 31 together with the piston 35 downwardly with the fluid in the cylinder 36 flowing slowly at this time through the slightly open valve 51 into the conduit 56 to flow through the conduit 57 back to the reservoir, so that at this time the moving means which acts through the press chamber means 31 on the outer cylinder surrounding the inner cylinder 16 provides a yielding of the cylinder 30 downwardly in response to the pressure within the supply chamber 29 so that the volume of this supply chamber increases and thus part of the material extruded from the chamber 15 is stored within the supply chamber 29 so as to be available to be extruded from this supply chamber by the auxiliary ram formed by the lower end of the cylinder 16 during the return stroke of the main ram 10, and in this way the extrusion of the covering material onto the continuously advancing cable is continued without interruption during the return stroke of the main ram 10.

The above-described operating cycles take place repeatedly so that with the structure of the invention a continuously moving cable or the like can be uniformly incased in a covering material. It will be noted that this result is achieved while using only a single extruding press structure and moreover the material which is extruded flows substantially along the common axis of the receiving chamber 15, supply chamber 29. Thus there is almost no appreciable change in the direction of flow of the extruded material and in this way a highly efficient structure is provided as well as a structure capable of extruding a material such as aluminum into a cable covering or the like.

While it is possible to completely fill the supply chamber 29 during the initial part of the working stroke of the main ram 10 and then to continue the extrusion of the block of metal or the like from the receiving chamber 15 during the remainder of the stroke of the main ram 10, it is preferred to provide through the setting of the valve 51 a yielding movement of the cylinder 30 which will cause the supply chamber 29 to reach its maximum volume simultaneously with the end of the working stroke of the main ram 10.

FIG. 2 shows the charge in the form of a heated metal block 63 located within the receiving chamber 15. The main ram 10 is shown in FIG. 2 on its way down into the receiving chamber 15. At its uppermost position there is sufficient space beneath the main ram 10 to permit the block 63 to be dropped without difficulty into the receiving chamber 15. FIG. 2 illustrates the inner sleeve 17, the intermediate sleeve 18, as well as the outer jacket 19 of the receiving chamber, the annular flange which serves for fixing this outer jacket in the manner described above in connection with FIG. 1 being omitted from FIG. 2. FIG. 2 also shows the heating elements 21a as well as cooling conduits 21b through which a cooling fluid flows, so that with this structure it is possible to control the temperature of the metal of the block 63. In FIG. 2 the plate 23 is omitted and instead the single plate 24 forms the lower wall of the receiving chamber 15, and this plate 24 is formed with the central bore coaxial with the receiving chamber 15 and forming the outlet end thereof. This plate 24 is located next to the plate 26 which is fixed to the central portion 22 of the crosshead 14 by the screws 27 as illustrated in FIG. 1. The inner cylinder 16 whose lower end face forms the auxiliary ram is shown in FIG. 2 carried by the plate 26 and extending downwardly therefrom into the cylinder 30. FIG. 2 also illustrates the sleeve 28 which lines the interior of the inner cylinder 16, and in the structure illustrated in FIG. 2 it is the upper portion of the sleeve 28 which forms the housing 25 of the non-return valve means. Just beneath the cylinder 16 within the cylinder 30 these cylinders 16 and 30 cooperate to form the supply chamber 29 which communicates, as illustrated in FIG. 2, through the substantially axially extending passages at the bottom of the supply chamber 29 with the press chamber means 31 through which the cable or the like continuously advances. The cylinder 30 is carried by the outer jacket 32 formed also with the conduits 21b for the cooling fluid and carrying also heating elements 21a, so that within the supply chamber 29 as well as in the press chamber means 31 it is also possible to very precisely regulate the temperature of the metal which is extruded. FIG. 2 further illustrates the base plate 34 fixed to the lower end of jacket 32 and to the upper end of the piston 35 which slides within the cylinder 36, the ring 37 supporting a sealing ring which provides fluid-tightness within the cylinder 36, and of course the plate 34 is formed with the passages 33 for receiving suitable cooling or heating means to control the temperature.

It will be noted that the heating elements 21a as well as the cooling conduits 21b are located at the upper portion of the cylinder 16 as well as at the plate 24, so that with the structure shown in FIG. 2 it is possible to control in a very precise manner the temperature of the extruded material during its entire movement from the block 63 to the covering for the cable.

The housing 25 of the non-return valve means is substantially cylindrical in configuration and houses the valve member 25a whose construction is shown most clearly in FIG. 3.

As is apparent from FIG. 3, the housing 25 of the non-return valve means has an upper annular surface 25f forming part of a cone whose apex is located above the annular surface 25f in the outlet end of the receiving chamber. The valve member 25a has an upper conical face 25b which engages the annular surface 25d are fixed to and extend radially from the valve member 25a includes a frustoconical surface 25c extending downwardly from the conical upper surface 25b and tapering so as to have a smaller cross-section toward the supply chamber. Three or four guide ribs 25d are fixed to and extend radially from the valve member 25a at its side surface 25c, and these guide ribs 25d are uniformly distributed about the axis of the valve member and have axially extending outer edges slidably engaging the cylindrical side surface of the housing 25, so that these ribs serve to guide the valve member for movement between the open and closed positions. In the open position of the valve which is illustrated in FIG. 3 the extruded material presses downwardly, as indicated by the arrow in FIG. 3, on the upper face 25b of the valve member and the latter is seated at the lower ends 25e of the guide ribs 25d on the lower surface of the housing 25, as indicated in FIG. 3. Between the botom end of the central body of the valve member 25a and the bottom end forces 25e of the guide ribs 25d the valve has each of its guide ribs tapered in a substantially V-shaped cross-section so as to provide the best possible flow of the extruded material. Thus, from the curved lines 25g down to the inner lower edges 25h of the guide ribs each of these ribs tapers to the relatively sharp edge 25h. When the valve is in the open position shown in FIG. 3 the extruded material flows in the direction indicated by the dot-dash lines provided with the arrowheads. In this way the extruded metal flows through the non-return valve means into the central bore 16a of the cylinder 16. It will be noted that the extruded material flows along all surfaces of the valve member 25a.

When the pressure in the supply chamber 29 is greater than the pressure within the receiving chamber 15, and this pressure differential occurs during the return stroke of the main ram 10, as described above, the extruded material presses upwardly against the valve member 25a to raise the latter to its closed position indicated in dot-dash lines in FIG. 3 where the upper surface 25b of the valve member is tightly seated against the surface 25F of the valve housing so that the extruded material cannot flow back into the receiving chamber 15. The extent of axial movement of the valve member 25a between its open and closed positions is indicated at S in FIG. 3.

In FIGS. 4a–4g the functioning of the several elements of the press of the invention is diagrammatically illustrated.

In the diagram shown in FIG. 4a time is indicated in minutes along the abscissa while pressure in tons is located along the ordinate. The operation of the cylinder 6 in which the piston 7 moves is shown in dot-dash lines. At the beginning of each cycle the pressure increases in a very short time to a maximum in the cylinder 6 and then as a result of the changes in direction of the flowing metal, which changes in direction are relatively small, as well as a result of the unavoidable friction of the metal against the surfaces along which it flows and the throttling of the flow of metal through the non-return valve means, the pressure of the metal within the supply chamber 29 is less than the pressure in the cylinder 6, as indicated in FIG. 4a. Also, between the supply chamber 29 and the press chamber means 31 there is a further pressure drop so that the reaction pressure acting on the piston 35 and the cylinder 36 is somewhat less than the pressure in the supply chamber 29, as indicated in dotted lines in FIG. 4a.

The working stroke of the main ram 10 lasts for eight minutes in each cycle in the illustrated example, and during this period of eight minutes the metal block is extruded out of the receiving chamber 15. Thus, the working stroke of the piston 7 also ends after eight minutes of each cycle and thus at this time the pressure in the cylinder 6 drops to zero. Simultaneously the pressure in the cylinder 36 increases due to the operation of the pump 38 as described above so that now the material which has been stored in the supply chamber 29 can continue to be extruded therefrom during the return stroke of the main ram 10. This phase of the operation takes place during the time that a fresh charge is placed in the receiving chamber 15, and the return stroke of the main ram 10 and the placing of a fresh charge in the receiving chamber 15 requires two minutes in the illustrated example so that at the end of ten minutes a cycle of operations has been completed and the next cycle starts, and FIG. 4a illustrates how these cycles of ten minutes duration take place repeatedly one after the other.

Of course, at the beginning of each cycle the pressure in the cylinder 36 drops to a value somewhat below the pressure in the supply chamber 29, and these pressures in the supply chamber 29 and cylinder 36 remain substantially constant for the initial eight minutes of each cycle.

Referring to FIG. 4b, it will be seen that as a result of the constant pressure which is maintained at all times in the supply chamber 29 the material in the latter is extruded out of this supply chamber at a constant rate. Due to this constant rate of flow of material from the chamber 29, the covering is very uniformly applied to the continuously moving cable or the like. The abscissa of FIG. 4b is in the same unit of time as the abscissa of FIG. 4a and the ordinate of FIG. 4b is in units of the amount of material such as cubic inches, for example.

FIG. 4c illustrates the rate of flow of material from the reveiving chamber 15 as well as in part into and in part out of the supply chamber 29. As is apparent from FIG. 4c during the initial eight minutes of each ten minute cycle the material which is extruded from the chamber 15 passes for the most part through the press into the press chamber 31. However, part of this material is stored in the supply chamber 29, as indicated in FIG. 4c. At the end of the first eight minutes of each cycle the extrusion from the receiving chamber 15 stops, and during the next two minutes the material which has been stored in the supply chamber 29 is extruded therefrom, as indicated in FIG. 4c. The units of the ordinate and absissa or FIG. 4c are the same as those in FIG. 4b.

FIG. 4d diagrammatically illustrates the operation of the non-return valve 25a. The ordinate of FIG. 4d indicates the distance through which the valve moves while the abscissa is in the same time units as FIGS. 4a–4c. Thus, during the first eight minutes of each cycle the valve 25a is in its open position, while during the remaining two minutes of each cycle this valve is in its closed position, as indicated in FIG. 4d. At the moment when the pressure in the supply chamber 29 becomes greater than the pressure in the receiving chamber 15, which is to say at the end of the working stroke of the main ram 10, the valve 25a automatically closes and remains closed for the last two minutes of each cycle.

The diagram of FIG. 4e shows the operation of the throttle valve 51. During the initial eight minutes of each cycle this valve 51 is slightly open so that only a small rate of flow of fluid therethrough can take place, and thus the pressure of the extruded material moving between the receiving chamber 15 and the press chamber means 31 is maintained. The fluid in the cylinder 36 has the same pressure as that which prevails in the press chamber means 31.

At the end of the initial eight minutes of each cycle the valve 51 is closed, as indicated in FIG. 4e, so that the fluid can no longer flow from the cylinder 36 back to the reservoir 42, and during this time the pump 38 delivers additional fluid under pressure to the cylinder 36 so as to raise the piston 35. This latter action takes place for the last two minutes of each cycle.

The diagram of FIG. 4f shows the functioning of the valves 45 and 50. During the working stroke of the main ram 10 these valves are closed, as was described above in connection with FIG. 1, and these valves remain in their closed positions for the first eight minutes of each cycle, and during the remaining two minutes of each cycle these valves are in their open position.

The valves 47 and 49 are in their open position while the valves 45 and 50 are closed, and the valves 47 and 49 are in their closed position while the valves 45 and 50 are open, as is apparent from a comparison of FIG. 4g with FIG. 4f. Thus, with this arrangement, as was described above in connection with FIG. 1, it is possible during the working stroke of the main ram 10 for the fluid to flow into the cylinder 6 and out of the cylinder 12, while the reverse flow takes place during the return stroke of the main ram 10.

Another embodiment of the invention is illustrated in FIGS. 5–8 in several different positions of operation, respectively. Referring to FIGS. 5–8, it will be seen that the lower beam 2' of the frame is also connected with the columns 4 fixed to this lower beam by the nuts 5, these columns 4 carrying additional nuts 5 so as to support the upper beam 3 which is formed with the cylinder 6 in which the piston 7 slides, a sealing ring similar to the sealing ring 8 also being shown in FIGS. 5–8. The piston 7 is connected in a manner described above with the crosshead 9 to which the main ram 10 is fixed, and between the crosshead 9 and the lower beam 2' is located the crosshead 14'.

This crosshead 14' is provided with the receiving chamber 15' which includes the inner sleeve 17 and an outer jacket 19', the intermediate sleeve 18 of FIGS. 1 and 2 being omitted. The elevation of the crosshead 14' is determined by nuts which are carried by the columns 4, so that the crosshead 14' remains at a fixed elevation.

Below the crosshead 14' is located a crosshead 70 which is vertical movable, being guided by the columns 4 which pass through openings of the crosshead 70, and in the embodiment of FIGS. 5–8 a plurality of pistons 35a are connected to the bottom end of the crosshead 70 and extend into the cylinders 36a, respectively. The hydraulic moving means of the embodiment of FIGS. 5–8 is identical with that of the embodiment of FIG. 1, so that the sequence of movement of the pistons 35a and the pistons 7 is the same. The return movement of the main ram 10 to its upper position shown in FIG. 5 may be provided by pistons 11 and cylinders 12 in the same way as described above in connection with FIG. 1.

According to the embodiment of the invention as shown in FIGS. 5–8, the receiving chamber 15' is provided with a bottom wall 64 extending transversely across the receiving chamber 15' and fixed to the sleeve 17, this transverse wall 64 being formed at its outer periphery with a plurality of passages 65 which form the outlet end of the receiving chamber 15'.

The supply chamber 29 of the embodiment of FIGS. 5–8 is also defined by a pair of telescoped cylinders, these cylinders including the outer cylinder 30', which is operatively connected with the press chamber means 31, this latter structure as well as the cylinder being carried by the crosshead 70 in the embodiment of the FIGS. 5–8, and the inner cylinder 69. This inner cylinder 69 takes the place of the cylinder 16 of the embodiments of FIGS. 1 and 2 and extends telescopically into the outer cylinder 30' to define with the latter the supply chamber 29. The cylinder 69 is formed with an axial bore 68 extending all the way therethrough. With the embodiment of FIGS. 5–8 the cylinder 69 is operatively connected to the receiving chamber 15' for limited movement with respect thereto. Thus, it will be seen that intermediate its ends the cylinder 69 fixedly carries an outwardly directed annular flange 66 which is located in an opening of the crosshead 14' immediately above a ring which is fixed to the bottom face of the crosshead 14'. This latter ring forms one of the limits on the movement of the cylinder 69. Thus, the downward movement of the cylinder 69 is limited by engagement of this ring with the flange 66. The lower faces of the sleeve 17 and the jacket 19' form the limit on the upper movement of the cylinder 69 by engagement with the flange 66 thereof as shown in FIG. 5, so that with the embodiment of FIGS. 5–8 a means is provided to effect a limited movement of the inner cylinder 69 which is operatively connected with the receiving chamber 15'. In this embodiment the upper free end portion 67 of the cylinder 69 forms the movable valve member of the non-return valve means and this upper free end portion 67 cooperates with the bottom face of the transverse wall 64 in order to cut off the flow of extruded metal back into the receiving chamber 15'. Thus, the lower face of the transverse wall 64 forms a seat for the upper portion 67 of the cylinder 69 to be engaged by this upper portion 67 when the non-return valve means of FIGS. 5–8 is in its closed position.

The parts are shown in FIG. 5 at the end of the upward movement of the crosshead 70. Fluid under pressure has been delivered by the pump 38, for example, into the cylinders 36a so as to raise the pistons 35a and the crosshead 70, and the cylinder 30' has moved upwardly along the cylinder 69 so as to extrude the metal from the supply chamber 29 into the press chamber 31.

As is apparent from FIG. 5 the main ram 10 in its uppermost position provides sufficient space for the block 63 to be dropped into the receiving chamber 15'. FIG. 6 illustrates the structure when the main ram 10 has started along its working stroke and is extruding the block 63 downwardly through the passages 65 which form the outlet end of the receiving chamber 15'. The pressure of the material extruded from the receiving chamber 15' acts on the top face of the cylinder 69 to move the latter downwardly from the position of FIG. 5 to that of FIG. 6 so as to automatically open the non-return valve means of this embodiment, and thus the flange 66 as well as the cylinder 69 are in their lower position in FIG. 6, and the metal is flowing along the central bore 68 of the cylinder 69 into the supply chamber 29. With this embodiment the supply chamber 29 has its smallest volume in the position of the parts shown in FIG. 6, since at the end of the upward movement of the crosshead 70, shown in FIG. 5, there is still space in the chamber 29 to accommodate the downward movement of the cylinder 69 brought about by opening of the non-return valve means. When the parts are in the position of FIG. 6, the throttling valve corresponding to the valve 51 is slightly open so that while most of the extruded material flows directly to the press chamber means 31, a relatively small fraction of this material is nevertheless stored in the supply chamber 29 whose volume is continuously increasing due to the yielding of the pistons 35a to the pressure of the material reaching the supply chamber 29, and these pistons 35a are slowly moving into the cylinders 36a while the material is continuously extruded into the press chamber 31.

Figure 8:
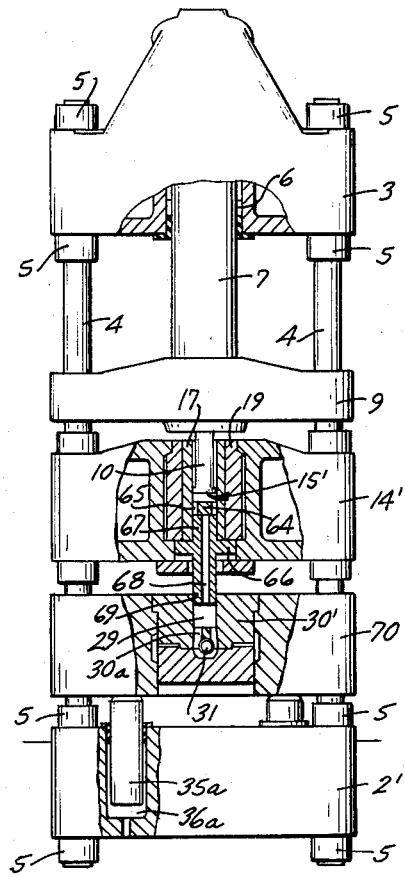

The parts are shown in FIG. 7 at the end of the working stroke of the main ram 10. At this time the supply chamber 29 has its maximum volume and the pistons 35a are at the lower end of their strokes. When the parts have reached the positions of FIG. 7, the main ram 10 is moved along its return stroke and of course the valve 51 is closed and fluid under pressure is introduced into the cylinders 36a so as to raise the pistons 35a and the crosshead 70 back toward the position shown in FIG. 5. The initial part of this movement will cause the entire structure to move upwardly with the cylinder 69 so that its upper end portion 67 engages the bottom face of the transverse wall 64 to close the non-return valve means, and then during the continued upward movement of the crosshead 70 the material will be extruded from the supply chamber 29 into the press chamber 31 so that the covering of the elongated cable takes place without interruption in the manner described above. The ports are shown in FIG. 8 in the position they take immediately after their position in FIG. 7 at the end of the working stroke of the main ram 10. The fluid under pressure introduced into the cylinders 36a at this time acts almost instantaneously to move the structure from the position of FIG. 7 to that of FIG. 8 so as to close the non-return valve means of this embodiment and then the upward movement continues from the position of FIG. 8 to that of FIG. 5 so that material is continuously extruded out of the supply chamber 29 during the return stroke of the main ram 10 and the placing of an additional charge 63 in the receiving chamber means 15.

It will be noted that with the embodiment of FIGS. 5–8, the initial portion of the material extruded from the block 63 through the passages 65 acts on the upper end of the cylinder 69 to move the latter downwardly from the position of FIG. 5 to that of FIG. 6, so that during the initial phase of each cycle of this embodiment the auxiliary ram formed by the bottom end face of the cylinder 69 acts as a result of the pressure of the extruded metal on the upper end of the cylinder 69 to extrude material from the supply chamber 29 into the press chamber 31, and except for this distinction the embodiments of FIGS. 5–8 operates substantially the same way as the above-described structure.

Of course, the embodiment of FIGS. 5–8 is provided with heating and cooling devices as described above in connection with FIGS. 1 and 2 for precisely regulating the temperature of the extruded metal. These temperature controlling devices of all embodiments of the invention enable the metal which is extruded to be maintained in an extremely ductile condition and also the temperature control means prevents undesired crystallization of the extruded metal, so that the best possible extruding conditions are maintained throughout the press. With the structure of the invention it is for the first time possible to incase a cable, pipe, or the like with a metal such as aluminum or a heavy metal, in a completely continuous manner without any of the disadvantages such as the formation of "bamboo rings." The charge in the form of a block 63 is preheated so that it is introduced in heated condition into the receiving chamber 15'.

With the structure of the invention the maximum volume of the supply chamber 29 never exceeds one-half the volume of the receiving chamber 15' and can be substantially less than the volume of the receiving chamber 15'.

The structure of the non-return valve means both of the embodiment of FIG. 3 and that of FIGS. 5–8 is exceedingly strong and capable of withstanding the extremely high pressures without any failure while at the same time these non-return valve means act to reliably prevent the return of extruded metal into the receiving chamber 15', with the exception of only an extremely slight amount of material which moves back during the actual movement of the non-return valve member from its open to its closed position.

In the embodiments of the invention shown in FIGS. 9 and 11, the receiving chamber is formed by the elongated housing 101 which has a hollow interior defining this receiving cahmber. The housing 101 extends along a predetermined axis and has an open top through which the charge 102 is placed within the receiving chamber. This charge 102 is in the form of a metal block, as described above. The main ram 103 in the embodiments of FIGS. 9 and 11 is coaxial with the receiving chamber 101 and is shiftable along the interior thereor for displacing the charge 102 therefrom. The main ram 103 is carried by a piston 104 which is slidable within the stationary cylinder 105 to which fluid under pressure is supplied in the manner described above in connection with the cylinder 6. Cylinders such as the cylinders 12 and pistons 11 cooperate with the piston 104 for moving the latter together with the main ram 103 upwardly along their return stroke back to their starting position.

The flow of material with these embodiments begins at the bottom end of the receiving chamber, as viewed in FIG. 9, and fixed to the bottom end of the receiving chamber is located a structure for preventing the material from flowing back into the receiving chamber once this material has been displaced therefrom by the main ram 103. This structure is of course a non-return valve means as described above, and in the embodiments of FIGS. 9 and 11 this valve means includes the ball member 106 and the valve seat 107 forming a constricted passage at the bottom end of the receiving chamber means 101. The parts are shown in FIGS. 9 and 11 at the beginning of a cycle of operations where the ram 103 is pressing downwardly on the block 102, and the downward pressure causes the material displaced ahead of the block 102 to move the ball valve member 106 downwardly from its seat 107 into engagement with a stop member 108 which limits the movement of the valve member 106 away from its seat 107. The stop member 108 is in the form of a relatively small body located substantially on the axis of the passage in the receiving chamber 101, this body 108 being connected to the remainder of the chamber 101 by a plurality of ribs extending radially from the body 108, distributed about the axis of the chamber 101, and fixed to the latter, so that the material displaced downwardly by the ram 103 flows downwardly through the space between the ribs. This non-return valve means 106 is located in advance of the supply chamber of this embodiment, this supply chamber being defined in part by the inner cylindrical member 101a fixed to and forming an extension of the receiving chamber 101 and having a downwardly directed annular end face, as viewed in FIGS. 9 and 11, which acts as an auxiliary ram in the manner described above. The inner cylindrical member 101a is slidably received within the outer cylindrical member 111 which cooperates with the inner cylindrical member to define the supply chamber 109, and the outer cylinder 111 is fixed to or formed integrally with the press chamber 110 of the embodiments of FIGS. 9 and 11. This press chamber 110 is located at the side of the receiving chamber 101 opposite from the main ram 103 and located along the common axis of the ram 103, the receiving chamber means 101, and the supply chamber 109 defined by the telescopically cooperating cylinders 101a and 111. The entrance end 112 of the press chamber means communicates with the supply chamber 109 and leads to a pair of branches 113 which introduce the material into the press chamber means at diametrically opposite sides of the cable. The cable 114 moves through the press chamber means at substantially right angles to the common axis of the structure shown in FIG. 9, and the structure which guides the cable and which distributes the covering material therearound is purely conventional and may be of the type shown in FIG. 1 of German Patent No. 953,246. Of course, this same structure may be used to advance the cable through the press of FIG. 1 and that of FIGS. 5–8.

According to the embodiment of the invention illustrated in FIGS. 9 and 10, the press chamber 110 together with the outer cylinder 111 are moved axially with respect to the stationary receiving chamber 101 by a moving means entirely independent of the moving means which acts on the main ram 103, as was described above in connection with FIG. 1. The moving means which acts on the press chamber 110 includes the piston 115 formed by the bottom end of the press chamber 110 and the stationary cylinder 116 in which the piston 115 moves. The piston 115 has fixed to its top end, as viewed in FIG. 9, an outwardly extending annular flange 117 which limits the downward movement of the press chamber 110, as viewed in FIG. 9. A conduit 122 serves to introduce a liquid such as water under pressure into the interior of the cylinder 116, this liquid under pressure being derived from a pump such as the pump 38 of FIG. 1 and serving to raise the piston 115 together with the press chamber 110 and the cylinder 111 upwardly to the position shown in FIG. 9, and a discharge conduit 121 leads from the interior of the cylinder 116 and is provided with the throttling valve 120 which corresponds to the above valve 51 and which is set by the operator to regulate the rate of discharge of liquid under pressure from the cylinder 116 during the movement of the press chamber 110 downwardly from the position of FIG. 9 to that of FIG. 10. The stationary receiving chamber 101 is carried by a support means 123, 124 in the form of a rigid arm 123 directly carrying the receiving chamber means 101 and in turn fixedly carried by the vertical columns 124 which are fixedly carried by the unillustrated base of the press of FIGS. 9 and 10.

As has been indicated above, at the beginning of the extrusion of the charge 102 downwardly through the receiving chamber means 101 by the main ram 103, the parts 110 and 111 are in their uppermost position shown in FIG. 9 where the inner cylinder 101a which forms the auxiliary ram extends to the greatest distance into the interior of the outer cylinder 111. The pressure of the material above the valve 106 moves the latter downwardly to its open position. Thus, at this time the material flows downwardly along a straight path to the press chamber 110, as was described above in connection with the other embodiments of the invention.

Normally, the downwardly directed forces acting on the column of material displaced downwardly by the main ram 103 would be absorbed by the support means 123, 124 which carries the receiving chamber means 101. However, in accordance with the invention, and as has already been indicated above, during the working stroke of the main ram 103 the throttling valve 120 is set to provide an accurately throttled discharge of liquid from the cylinder 116 so that while the main ram 103 moves downwardly to extrude material from the receiving chamber means 101, the press chamber means 110 together with the cylinder 111 are simultaneously moving downwardly and the volume of the supply chamber 109 is increasing to receive material displaced by the main ram 103. The setting of the valve 120 is so controlled that the downward movement of the press chamber 110 together with the cylinder 111 is distributed over substantially the entire downward stroke of the main ram 103. Thus, the supply chamber 109 increases in volume during this part of each cycle of operations, and in this way a part of the material extruded from the receiving chamber 101 is received by and stored in the supply chamber 109.

When the main ram 103 has reached the end of its working stroke, the valve 120 is closed and a hydraulic fluid such as water under pressure is introduced into the cylinder 116 through the conduit 122, and if desired the introduction of the water under pressure into the cylinder 116 may begin shortly before the main ram 103 reaches the end of its downward stroke, as is apparent from the diagrams of FIGS. 4a–4g. At this time the parts have the position indicated in FIG. 10 which clearly illustrates how part of the material displaced by the main ram 103 is now located in the supply chamber 109. The water under pressure in the cylinder 116 exerts an upwardly directed force on the press chamber 110 and the cylinder 111 so that the material in the supply chamber 109 acts upwardly on the ball valve member 106 to automatically move the latter upwardly to the valve seat 107 for closing off the receiving chamber from the supply chamber 109 during this phase of each cycle of operations. The upward movement of the press chamber means 110 and the cylinder 111 with respect to the receiving chamber means 101 and auxiliary ram 101a causes the volume of the supply chamber 109 to diminish and continues the displacement of material to the press chamber 110. The entire downwardly directed bottom end face of the auxiliary ram 101a as well as the material within the ram 101a presses downwardly on the material in the supply chamber 109 to displace this material into the press chamber while the press chamber 110 and the cylinder 111 are moved upwardly from the position of FIG. 10 to that of FIG. 9, and during this phase of each cycle of operations the main ram 103 is raised in the manner described above in connection with FIG. 1, for example, out of the receiving chamber 101 and a fresh charge 102 is placed therein and the main ram 103 is returned back to the position of FIG. 9 to start another cycle of operations when the press chamber 110 and cylinder 111 have been raised by the water under pressure and the cylinder 116 to the position shown in FIG. 9. At this time the displacement of material from the supply chamber 109 alone stops, and the main ram 103 is moved downwardly to start off the next cycle of operations, these cycles being repeated continuously, so that in this way a continuously operating cable covering press is provided with but a single receiving chamber for the charge 102 and with a substantially straight line flow of material from the receiving chamber to the press chamber means.

The cylinder 116 carries at its top face a split stop ring 118 which engages the flange 117 to limit the downward movement of the piston 115 and press chamber 110, and the thickness of the stop ring 118 is such that when it is removed the flange 117 together with the piston 115 can move downwardly into the cylinder 116 through a distance sufficient to place the cylinder 111 out of engagement with the cylinder 101a, so that in this way the press chamber 110 can be exchanged without disconnecting the cylinder 111 therefrom.

The rate of displacement of material from the supply chamber 109 during the second phase of each cycle when the auxiliary ram 101a and the outer cylinder 111 shift axially with respect to each other is such that annular ridges similar to bamboo rings do not form on the cable covering and at the same time no imperfections are formed in the cable covering. The setting of the discharge valve 120 controls the rate of displacement of material from the supply chamber 109.

It is also possible to produce the desired results with an arrangement where the press chamber 110 together with the cylinder 111 are stationary and the receiving chamber 101 together with the auxiliary ram 101a are axially moved with a moving means independent of the means which moves the ram 103, and FIGS. 11 and 12 illustrate such a construction. Thus in the embodiment of FIGS. 11 and 12 the press chamber 110 together with the other cylinder 111 are stationary. The receiving chamber 101 is carried by a rigid member 123, but in this case the pair of columns 125 (only one of which is shown in FIGS. 11 and 12) which are fixed to the member 123 symmetrically with respect to the receiving chamber 101 are connected at their top ends with the pistons 127 which are respectively slidable in a pair of cylinders 126 fixedly carried by the cylinder 105 at opposite sides thereof. A supply conduit 129 communicates with each cylinder 126 to supply liquid under pressure thereto, and a discharge conduit leading from each cylinder 126 includes a valve 128 which controls the rate of discharge of liquid from each cylinder 126. The parts are shown in FIG. 11 in the position they have when the ram 103 has started its downward movement, the position of the parts in FIG. 11 corresponding to the position of the parts in FIG. 9. At this time the receiving chamber 101 is in its lowermost position where the auxiliary ram 101a extends to its greatest extent into the outer cylinder 111. When the ram 103 moves downwardly the valves 128 provide an accurately throttled discharge of liquid from the cylinders 126 and part of the material displaced from the receiving chamber by the ram 103 enters into the supply chamber 109 and acts against the bottom face of the inner cylindrical member 101a to raise the latter together with the receiving 101, from the position of FIG. 11 to that of FIG. 12. With this construction, the area of the downwardly directed bottom end face of the auxiliary ram 101a is greater than those areas of the receiving chamber 101 which are directed upwardly to receive the force of the downwardly pressed material, so that the total force acting upwardly against the bottom end face of the inner cylinder 101a is greater than the downwardly directed forces acting on the receiving 101, so as to guarantee that the latter rises while the ram 103 moves downwardly. When the parts reach the position shown in FIG. 12 the valves 128 are closed and the water under pressure is introduced into the cylinders 126 through the conduits 129 to displace the piston 127 downwardly and thus move the auxiliary ram 101a into the supply chamber 109 to displace material therefrom to the press chamber so as to continue the covering of the cable. At this time the material in the supply chamber acts to move the ball valve member 106 to its closed position so that the receiving chamber is cut off from the supply chamber, and during this second phase of each cycle the ram 103 is removed and a new charge is placed in the receiving chamber. When the parts have again reached the position of FIG. 11 the next cycle is started without interruption.

A comparsion of the embodiment if FIGS. 9 and 10 with that of FIGS. 11 and 12 shows that with the embodiment of FIGS. 11 and 12 the receiving chamber 101 is moving in a direction opposite to the downward movement of the ram 103 while the latter is displacing material from the receiving chamber, so that with this embodiment the absolute stroke of the main ram 103 can be smaller than with the embodiment of FIGS. 9 and 10 as well as with the other embodiments of the invention described above.

As is apparent from the above description, the structure of the invention operates continuously, only one receiving chamber is provided, and the material flows from the receiving chamber to the press chamber substantially along a straight line. The receiving chamber itself forms part of the straight line path of flow of the material, and the auxiliary ram acts in the same direction as the main ram. Thus, the structure which moves the auxiliary ram in the case of FIGS. 11 and 12 or the outer cylinder in the other embodiments can be supported on the same frame which is provided for the support of the piston and crosshead structure which is connected to the main ram. Thus, it is possible to connect the auxiliary ram with the outer cylinder or press chamber and to provide on the receiving chamber a cylinder surrounding the auxiliary ram.

The structure of the invention is relatively simple since all of the members act in the same direction and it is unnecessary to provide a drive acting in a different direction from which the main ram moves. Thus, laterally extending columns are necessary. Adapting the construction for use with a liquid rather than a solid charge where additional time is required for hardening of the liquid charge does not create any particular difficulties with the structure of the invention because the moving means which moves the auxiliary ram acts in the same direction as the moving means which moves the main ram, the auxiliary moving means actually moving the outer cylinder in all of the embodiments except that of FIGS. 11 and 12.

It will be understood that each of the elements described above, or two or more together, may also find a useful application in other types of presses differing from the types described above.

While the invention has been illustrated and described as embodied in cable covering presses, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a press for uniformly incasing in a covering of metal or the like an elongated member which continuously advances longitudinally through the press, in combination, receiving chamber means extending along a predetermined axis, having an inlet end and an opposed outlet end, and defining a receiving chamber for receiving a charge of covering material; a main ram coaxial with said receiving chamber means; first moving means operatively connected with said main ram for axially moving the same cyclically along a working stroke into said receiving chamber means through said inlet end thereof, for pressing the charge out of said receiving chamber means through said outlet end thereof, and along a return stroke out of said receiving chamber means so that the latter may be provided with a fresh charge before the next working stroke; press chamber means defining a press chamber through which an elongated member to be covered continuously passes and in which the covering material is pressed around the elongated member; an outer hollow cylinder and an inner hollow cylinder telescopically extending into said outer cylinder and defining a supply chamber therewith, one of said cylinders being operatively connected to one of said chamber means and the other of said cylinders being operatively connected to the other of said chamber means; non-return valve means located between said supply chamber and said receiving chamber means for preventing material from flowing from said supply chamber into said receiving chamber means; second moving means operatively connected with one of said cylinders for moving the same; and control means operatively connected with said second moving means for actuating the same to move said one cylinder in a direction which reduces the volume of said supply chamber during the return stroke of said main ram and for providing yielding movement of said one cylinder during the working stroke of the main ram, in response to the pressure of the material in said supply chamber, in an opposite direction which increases the volume of the supply chamber so that part of the covering material is stored in said supply chamber during the working stroke of said main supply chamber is held substantially constant during operation of the press and the elongated member is continuously and uniformly covered with covering material as the elongated member passes continuously through said press chamber.

2. In a press as recited in claim 1, said first moving means being hydraulic and including a first cylinder and piston means operatively connected to said main ram for moving the latter along its working stroke and a second cylinder and piston means operatively connected to said main ram for moving the latter along its return stroke.

3. In a press as recited in claim 1, temperature-controlling means operatively connected with said receiving chamber means, supply chamber, and press chamber means for controlling the temperature of the material which flows through said receiving chamber means, supply chamber, and press chamber means.

4. In a press as recited in claim 1, said first and second moving means being hydraulic and respectively including a pair of independent pumps for respectively actuating said first and second moving means.

5. In a press as recited in claim 1, said supply chamber having a maximum volume which is not greater than one half the volume of said receiving chamber means.

6. In a press as recited in claim 1, wherein said second moving means is operatively connected to said outer hollow cylinder.

7. In a press as recited in claim 1, wherein said second moving means is operatively connected to said inner hollow cylinder.

8. In a press as set forth in claim 1, wherein said outer hollow cylinder and said inner hollow cylinder are coaxial with said receiving chamber means and wherein said press chamber means is located on the axis of said receiving chamber means.

9. In a press for uniformly incasing in a covering of metal or the like an elongated member which continuously advances longitudinally through the press, in combination, receiving chamber means extending along a predetermined axis, having an inlet end and an opposed outlet end, and defining a receiving chamber for receiving a charge of covering material; a main ram coaxial with said receiving chamber means; first moving means operatively connected with said main ram for axially moving the same cyclically along a working stroke into said receiving chamber means through said inlet end thereof, for pressing the charge out of said receiving chamber means through said outlet end thereof, and along a return stroke out of said receiving chamber means so that the latter may be provided with a fresh charge before the next working stroke; press chamber means defining a press chamber through which an elongated member to be covered continuously passes and in which the covering material is pressed around the elongated member; an outer hollow cylinder and an inner hollow cylinder telescopically extending into said outer cylinder and defining a supply chamber therewith, one of said cylinders being operatively connected to one of said chamber means and the other of said cylinders being operatively connected to the other of said chamber means; second moving means operatively connected with one of said cylinders for moving the same, while said first moving means moves said main ram along said return stroke in a direction which reduces the volume of said supply chamber so that the flow of material into said press chamber means continues while a fresh charge is placed in said receiving chamber means, said second moving means providing, during the working stroke of said main ram, a yielding movement of said one cylinder, in response to the pressure of the material in said supply chamber, in an opposite direction which increases the volume of said supply chamber so that part of the covering material is stored in said supply chamber during the working stroke of said main ram to be available for displacement out of said supply chamber during the return stroke of said main ram, the cylinder which is operatively connected to said receiving chamber means having intermediate its ends an outwardly directed annular flange and means connected to said receiving chamber means for providing a limited axial movement of said flange and said cylinder operatively connected to said receiving chamber means, the latter cylinder having next to said outlet end of said receiving chamber means a free end portion which forms a non-return valve means for preventing material from flowing from said supply chamber into said receiving chamber means, said receiving chamber means having at its outlet end a transverse wall formed at its periphery with a plurality of passages through which the material can flow through said outlet end of said receiving chamber means, and said transverse wall being engaged by said free end of said cylinder operatively connected to said receiving chamber means when said non-return valve means is in its closed position, said free end of said cylinder operatively connected to said receiving chamber means being spaced from said transverse wall when said non-return valve means is in its open position.

10. In a press for uniformly incasing in a covering of metal or the like an elongated member which continuously advances longitudinally through the press, in combination, receiving chamber means extending along a predetermined axis, having an inlet end and an opposed outlet end, and defining a receiving chamber for receiving a charge of covering material; a main ram coaxial with said receiving chamber means; first moving means operatively connected with said main ram for axially moving the same cyclically along a working stroke into said receiving chamber means through said inlet end thereof, for pressing the charge out of said receiving chamber means through said outlet end thereof, and along a return stroke out of said receiving chamber means so that the latter may be provided with a fresh charge before the next working stroke, said first moving means including a first cylinder and piston means operatively connected with said main ram for moving the latter along its working stroke, second cylinder and piston means operatively connected to said main ram for moving the latter along its return stroke, a pressure conduit for fluid under pressure, a first valve communicating with said pressure conduit, a second valve communicating with said pressure conduit upstream of said first valve, a second conduit leading from said second valve to said first cylinder and piston means, a third conduit leading from said first valve to said second cylinder and piston means, a return flow conduit communicating with a reservoir of fluid, a third valve communicating with said third conduit and return flow conduit, and a fourth valve communicating with said second conduit and return flow conduit, whereby when said first and fourth valves are closed and said second and third valves are opened fluid will flow from said pressure conduit through said second conduit to said first cylinder and piston means and from said second cylinder and piston means through said third conduit to said return flow conduit, while when said first and fourth valves are opened and said second and third valves are closed fluid will flow from said pressure conduit through said third conduit to said second cylinder and piston means and from said first cylinder and piston means through said second conduit to said return flow conduit; press chamber means defining a press chamber through which an elongated member to be covered continuously passes and in which the covering material is pressed around the elongated member; an outer hollow cylinder and an inner hollow cylinder telescopically extending into said outer cylinder and defining a supply chamber therewith, one of said cylinders being operatively connected to one of said chamber means and the other of said cylinders being operatively connected to the other of said chamber means; non-return valve means located between said supply chamber and said receiving chamber means for preventing material from flowing from said supply chamber into said receiving chamber means; second moving means operatively connected with one of said cylinders for moving the same, while said first moving means moves said main ram along said return stroke, in a direction which reduces the volume of said supply chamber so that the flow of material into said press chamber means continues while a fresh charge is placed in said receiving chamber means, said second moving means providing, during the working stroke of said main ram, a yielding movement of said one cylinder, in response to the pressure of the material in said supply chamber, in an opposite direction which increases the volume of said supply chamber so that part of the covering material is stored in said supply chamber during the working stroke of said main ram for displacement by said one cylinder out of the supply chamber during the return stroke of said main ram.

11. In a press for uniformly incasing in a covering of metal or the like an elongated member which continuously advances longitudinally through the press, in combination, receiving chamber means extending along a predetermined axis, having an inlet end and an opposed outlet end, and defining a receiving chamber for receiving a charge of covering material; a main ram coaxial with said receiving chamber means; first moving means operatively connected with said main ram for axially moving the same cyclically along a working stroke into said receiving chamber means through said inlet end thereof, for pressing the charge out of said receiving chamber means through said outlet end thereof, and along a return stroke out of said receiving chamber means so that the latter may be provided with a fresh charge before the next working stroke; press chamber means defining a press chamber through which an elongated member to be covered continuously passes and in which the covering material is pressed around the elongated member; an outer hollow cylinder and an inner hollow cylinder telescopically extending into said outer cylinder and defining a supply chamber therewith, one of said cylinders being operatively connected to one of said chamber means and the other of said cylinders being operatively connected to the other of said chamber means; non-return valve means located between said supply chamber and said receiving chamber means for preventing material from flowing from said supply chamber into said receiving chamber means; second hydraulic moving means operatively connected with one of said cylinders for moving the same, while said first moving means moves said main ram along said return stroke in a direction which reduces the volume of said supply chamber so that the flow of material into said press chamber means continues while a fresh charge is placed in said receiving chamber means, said second moving means including a discharge valve; and means for slightly opening said discharge valve during the working stroke of said main ram so as to permit a yielding movement of said one cylinder, in response to the pressure of the material in the supply chamber, in an opposite direction which increases the volume of the supply chamber as a result of the throttled flow of hydraulic fluid through said slightly opened discharge valve so that part of said covering material is stored in said supply chamber during the working stroke of said main ram to be available for displacement out of said supply chamber during the return stroke of said main ram, and so that the pressure of the material in said supply chamber is maintained substantially constant during operation of the press.

References Cited by the Examiner

UNITED STATES PATENTS

| | | | |
|---|---|---|---|
| 867,658 | 10/07 | Hoopes et al. | 207—10.4 |
| 1,177,097 | 3/16 | Garretson | 207—2 |
| 1,664,976 | 4/28 | Hanff | 207—2 |
| 1,741,816 | 12/29 | Boynton | 207—4 XR |
| 1,983,761 | 12/34 | Jacobson | 207—4 XR |
| 2,155,980 | 4/39 | Reichelt | 207—4 XR |
| 2,620,922 | 12/52 | Deutsch | 207—2 |
| 2,755,926 | 7/56 | Horn | 207—10 |
| 2,781,903 | 2/57 | Buffet et al. | 207—10 |
| 2,884,129 | 4/59 | Ljungberg | 207—4 |
| 2,897,783 | 8/59 | Drexler | 207—2 XR |
| 2,964,177 | 12/60 | Scribner | 207—4 XR |
| 2,981,409 | 4/61 | Colleoni | 207—4 |

FOREIGN PATENTS

| | | |
|---|---|---|
| 998,036 | 9/51 | France. |
| 440,542 | 2/27 | Germany. |
| 476,452 | 5/29 | Germany. |
| 643,990 | 10/50 | Great Britain. |
| 751,292 | 6/56 | Great Britain. |
| 821,909 | 10/59 | Great Britain. |
| 234,398 | 1/45 | Switzerland. |

CHARLES W. LANHAM, *Primary Examiner.*

WILLIAM W. DYER, Jr., MICHAEL V. BRINDISI,
*Examiners.*